United States Patent
Maeno et al.

(10) Patent No.: US 6,790,373 B2
(45) Date of Patent: Sep. 14, 2004

(54) MICROLENS, ITS FORMING METHOD AND OPTICAL MODULE

(75) Inventors: Yoshinori Maeno, Tokyo (JP); Takeshi Takamori, Tokyo (JP); Hironori Sasaki, Yamanashi (JP); Masahiro Uekawa, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 281 days.

(21) Appl. No.: 10/131,250

(22) Filed: Apr. 25, 2002

(65) Prior Publication Data

US 2002/0158041 A1 Oct. 31, 2002

(30) Foreign Application Priority Data

Apr. 26, 2001 (JP) ......................................... 2001-129021

(51) Int. Cl.$^7$ ................................................. G02B 3/00
(52) U.S. Cl. .............................. 216/24; 216/26; 216/46; 216/52; 216/67; 216/83; 216/88
(58) Field of Search .................................. 216/2, 11, 24, 216/26, 46, 52, 67, 83, 88

(56) References Cited

U.S. PATENT DOCUMENTS

| | | | | |
|---|---|---|---|---|
| 4,952,026 A | * | 8/1990 | Bellman et al. | ............. 359/619 |
| 5,370,768 A | | 12/1994 | Mersereau et al. | ......... 156/643 |
| 5,853,960 A | | 12/1998 | Tran et al. | ................... 430/321 |
| 6,055,107 A | | 4/2000 | Li et al. | ...................... 359/569 |
| 6,618,201 B2 | * | 9/2003 | Nishikawa et al. | ......... 359/619 |
| 6,727,163 B2 | * | 4/2004 | Kim et al. | .................. 438/464 |

FOREIGN PATENT DOCUMENTS

| | | | | |
|---|---|---|---|---|
| GB | 2175411 | | 11/1986 | |
| JP | 07049407 A | * | 2/1995 | ............ G02B/5/18 |
| JP | 2713550 | | 10/1997 | |
| JP | 11142607 A | * | 5/1999 | ............ G02B/3/00 |
| JP | 11-149007 | | 6/1999 | |
| JP | 11149007 A | * | 6/1999 | ............ G02B/5/18 |
| JP | 2001077054 A | * | 3/2001 | ......... H01L/21/301 |

OTHER PUBLICATIONS

Hironori Sasaki et al., "Design considerations of stacked multilayers of diffractive optical elements for optical network units in optical subscriber–network applications", Applied Optics, vol. 37, No. 17, Jun. 10,1998 pp. 3735–3745.

Hongtao Han et al., "Integration of silicon bench micro–optics", Proc. SPIE vol. 3631, Apr. 1999, pp. 234–243.

* cited by examiner

Primary Examiner—Anita Alanko
(74) Attorney, Agent, or Firm—Wenderoth, Lind & Ponack, L.L.P.

(57) ABSTRACT

A method for forming many microlenses comparatively easily and effectively is provided. On one end of an optical substrate is formed a plurality of lens planes at regular intervals. Lens areas containing the lens planes are partially covered by an etching mask and etching processing is performed on areas being exposed outside the etching mask to remove the areas to a specified depth. While the lens planes formed on one surface of the optical substrate are being held by a support substrate, polishing processing is performed on another end face of the optical substrate and each microlens formed in the lens areas is separated from the support substrate.

12 Claims, 10 Drawing Sheets

ANTIREFLECTION FILM IS FORMED

⇧

UV LIGHT

ANTIREFLECTION FILM IS FORMED

⇩

MICROLENS, ITS FORMING METHOD AND OPTICAL MODULE

BACKGROUND OF THE INVENTION

1. Field of the Invention

The present invention relates to a microlens and its forming method being suitably used in devices for optical communications and more particularly to the microlens and its forming method being suitably applied to formation of many very fine and small diffractive optical elements such as computer-generated hologram (CGH) devices.

2. Description of the Related Art

A method for forming many microlenses each being coupled to an optical fiber is disclosed in "Proceeding SPIE (Vol. 3631, p234–243)" issued in April 1999. According to this conventional technology, by tying many cylindrical optical elements each having an outer diameter equal to that of an optical fiber in a bundle and by performing etching processing on end faces of the optical elements using specified etching mask, many specified lens planes can be formed on an end face of each of the many optical elements in a collective manner.

By using the microlens made from such the optical element having the same outer diameter as that of the optical fiber, when the microlens is placed in a V-groove on a substrate in a manner that an end face of a lens plane faces an end of the optical fiber being also placed in the V-groove, it is possible to accurately align an optical axis of the microlens with that of the optical fiber.

However, the conventional method for forming the microlens described above has problems. That is, in the conventional method, in order to collectively form the lens plane on end faces of many optical elements, it is necessary to surely and accurately tie many optical elements in a bundle, however, it is not easy to accurately tie many optical elements in a bundle and to reliably form the lens plane on the end faces of the many optical elements.

SUMMARY OF THE INVENTION

In view of the above, it is an object of the present invention to provide a method for forming many microlens comparatively easily and effectively. It is another object of the present invention to provide a novel microlens which enables exact alignment of an optical axis of the microlens with an optical axis of the optical fiber.

According to a first aspect of the present invention, there is provided a method of forming a plurality of microlenses including the steps of:

forming a plurality of lens planes on one surface of an optical substrate;

forming a plurality of mask portions respectively on each the lens planes;

forming lens element portions which has the lens plane and becomes microlens respectively under each of the mask portions by an etching process conducted on the optical substrate;

removing all mask portions;

holding these lens element portions by a holding means from the side the one surface of the optical substrate is located;

removing a remainder of the optical substrate excluding these lens element portions for leaving these lens element portions by a removing process;

eliminating the holding means from all lens element portion by a eliminating process.

With the above configuration, after forming collectively and integrally a plurality of lens element portions each containing a lens plane by the etching process and others conducted on an optical substrate having a plurality of lens planes, separating these lens element portions by the removing process and the eliminating process. Therefore, a plurality of microlenses each made up of the lens element portions is formed easily and effectively.

In the foregoing, the etching process may be an etching processing to etch an exposure area portion being not covered by these mask portions.

Also, the etching process may contain a etching processing to etch an exposure area portion being not covered by these mask portions for forming a part of the lens element portion, a forming processing to form a protecting film on a wall surrounding face of the part formed by the etching processing, and a film removing processing conducted after all lens element portions are formed by conducting the etching processing and the forming processing repeatedly to remove the protecting film.

Also, the etching process may be conducted by using etching gas exhibiting an anisotropic etching characteristic.

With the above configuration, it is possible to provide a desired length to each microlens.

In the method, the optical substrate may be made up of a crystal substrate, the crystal substrate may be a silicon crystal substrate. When using the silicon crystal substrate, the removing process may be a polishing processing.

Also, in the method, the optical substrate may be SOI substrate. It has a silicon layer having the one surface and providing a thickness in correspondence with a length of the microlens, a silicon dioxide layer fixed on the silicon layer, and a silicon substrate layer fixed on the silicon dioxide layer. When using the SOI substrate, the removing process is a dissolving processing to dissolve said silicon dioxide layer.

In the method, the holding means may consist of a wax material layer used to fill the space between these lens element portions and covering all lens element portions, and a holding substrate fixed on the wax material layer. When using the holding means, the eliminating process is a dissolving processing to dissolve the wax material layer.

In the method, the microlens may be a diffractive optical element, in this case, the lens plane of the diffractive optical element is formed.

Also, in the method, moreover the steps may be comprised that are to form a antireflection film on each of end faces of all lens element portions which is located on an opposite side of the lens plane after finishing the removing process, to use a support means to support all lens element portions from the side all the end faces are located on which the antireflection film is formed before conducting the eliminating process, to form a antireflection film on all lens planes of all lens element portions after finishing the eliminating process, and to remove the support means from all lens element portions by conducting a support means eliminating process.

The support means may have a support substrate to support all lens element portions through UV (Ultraviolet) resin layer, said support means eliminating process is a dissolving processing to dissolve the UV resin layer.

Also, there is provided a method of forming a plurality of microlens including the steps of:

forming a plurality of lens planes on one surface of an optical substrate;

forming a plurality of mask portions respectively on each of the lens planes;

forming lens element portions which has the lens plane and becomes the microlens respectively under each of the mask portions by an etching process conducted on the optical substrate;

forming a mold by using the optical substrate as an original substrate obtained after all the mask potions are removed for reproducing the optical substrate forming replica substrates by using the mold;

holding all lens element portions of the replica substrate by a holding means from the side one surface of the replica substrate is located;

removing a remainder of the replica substrate excluding these lens element portions for leaving these lens element portions by a removing process;

eliminating the holding means from all lens element portions by a eliminating process.

According to a second aspect of the present invention, there is provided a microlens formed by methods stated above, wherein the microlens is placed in series to face an optical fiber in a V-groove on a substrate, and it has an outer diameter in correspondence with that of said optical fiber and a lens plane facing the optical fiber.

Also, there is provided a microlens formed by a method stated above, wherein the microlens is substantially a cylindrical shape as a whole, and has one end face on which the lens plane is formed and another end face which is opposed to the one end face.

Also, there is provided an optical module including:

a microlens stated above, an optical fiber having an outer diameter being substantially same as that of the microlens, and a substrate having a groove wherein the microlens and the optical fiber are placed in the groove in series, and the lens plane of the microlens faces one end face of the optical fiber.

Also, the groove may be V-groove.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with reference to the accompanying drawings.

First Embodiment

FIG. 1 is a process diagram illustrating a method for forming a microlens according to a first embodiment of the present invention. Prior to description of the method for forming the microlens of the first embodiment, an example in which the microlens formed by the method of the first embodiment is used will be explained by referring to FIG. 2.

Figure 2:
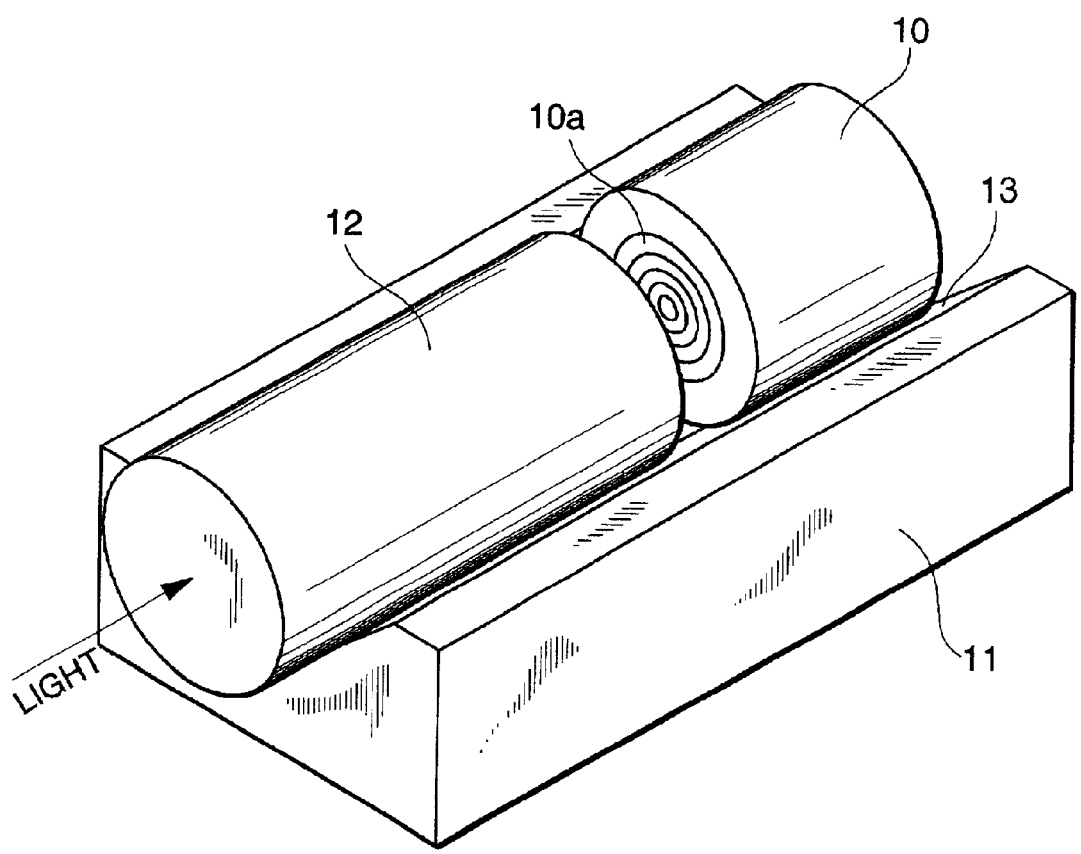
FIG. 2 is a perspective view showing an example in which the microlens formed by the method of the first embodiment of the present invention is used.

The microlens 10 formed by the method of the present invention is used as an optical element, for example, for optical communications. FIG. 2 shows an example of optical module using the microlens. In the example shown in FIG. 2, the microlens 10 is placed on a semiconductor substrate, for example, silicon substrate 11 serving as a support substrate and is used to gather signal light emitted from an optical fiber 12 at a specified place or to gather signal light emitted from a light source such as a laser diode (not shown) and to guide the gathered light into the optical fiber 12 and, thus, the microlens 10 is used in combination with the optical fiber 12.

As the semiconductor substrate 11, for example, a silicon substrate is employed. On the substrate is formed, by using an etching method, a V-groove 13 used for positioning of the optical fiber 12. In the example shown in FIG. 2, the cylindrical microlens 10 having an optical characteristic to gather light emitted from the optical fiber 12 at a specified place, is arranged in the V-groove 13 on the substrate 11 in a manner that its lens plane 10a faces an end face of the optical fiber 12.

The optical fiber 12 is a single mode optical fiber having an outer diameter of 125 $\mu$m adapted to guide signal light having a wavelength of, for example, 1.3 $\mu$m or 1.5 $\mu$m, and the microlens 10 is placed in the V-groove 13, with its optical axis being aligned with that of the optical fiber 12, so that it can be coupled optically to the optical fiber 12.

The microlens 10 is made up of a cylindrical optical element having an outer diameter of, for example, 125 $\mu$m being equal to an outer diameter of the optical fiber 12 and a height of 100~200 $\mu$m. The microlens 10 may be made up of an optical material such as silica or silicon if light having a wavelength of 1.3 $\mu$m or 1.5 $\mu$m described above is handled, and the lens plane 10a of the optical element is formed at an end face of the optical element to obtain a desired optical characteristic.

By forming the microlens 10 so that its outer diameter matches that of the optical fiber 12 and by placing the microlens 10 and the optical fiber 12 in the V-groove 13, easy alignment of the optical axis of the microlens 10 with that of the optical fiber 12 can be implemented with high accuracy.

Next, the method of collectively forming many microlens 10 will be explained by referring to FIG. 1. As an optical substrate on which the microlens 10 is formed, a silicon crystal substrate (for example, a silicon wafer or a like) 14 having a thickness of, for example, 600 $\mu$m is employed. On a surface 14a of the silicon crystal substrate 14, as shown in FIG. 1(a), many lens planes 10a each exhibiting a desired optical characteristic of the microlens 10 are formed at regular intervals.

The many fine and small lens planes 10a having a diameter of, for example, of 125 μm can be formed by using photo-lithography and etching technology being applied to Si LSI manufacturing process. That is, by performing etching processing on the surface 14a of the silicon crystal substrate 14, many lens planes 10a each exhibiting a desired optical characteristic can be collectively formed with high accuracy.

Figure 1A:
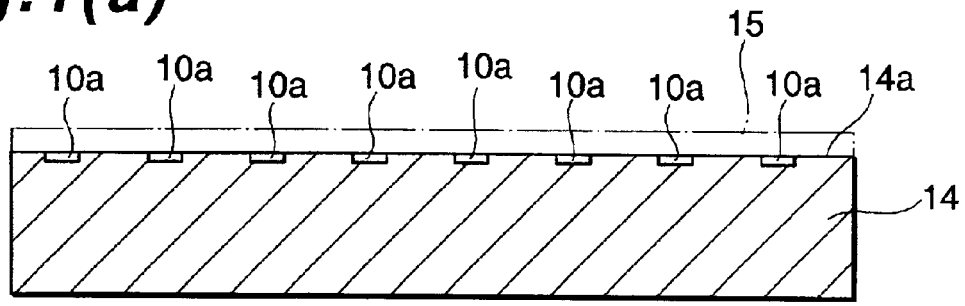
FIG. 1 is a process diagram illustrating a method for forming a microlens according to a first embodiment of the present invention.
Figure 1B:
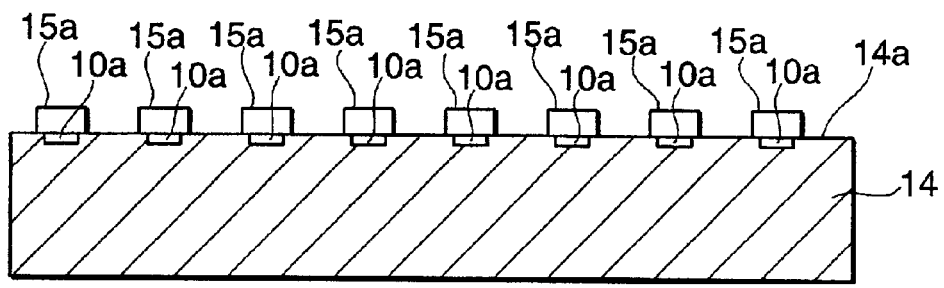

As shown by a chain line in FIG. 1(a), after a photoresist layer 15 to cover the surface 14a of the silicon crystal substrate 14 has been formed, selective exposing processing is performed on the photoresist layer 15 using a photomask (not shown) corresponding to the lens plane 10a. By the processing of development following the selective exposure process, as shown in FIG. 1(b), a plurality of mask patterns 15a, that is, as mask portions made up of the photoresist covering each lens plane 10a are formed.

Figure 1C:
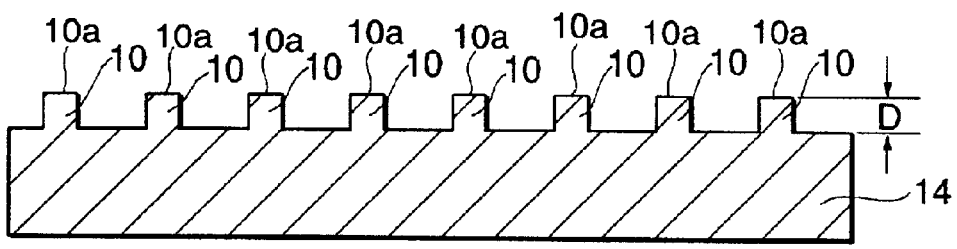

After the formation of the plurality of mask patterns 15a, by selective etching processing using these mask patterns 15a as an etching mask, a surface area of the substrate 14 being not covered by these mask patterns 15a is etched to a specified depth "D". After the etching processing, as shown in FIG. 1(c), the etching mask, that is, these mask patterns 15a are removed.

Figure 1D:
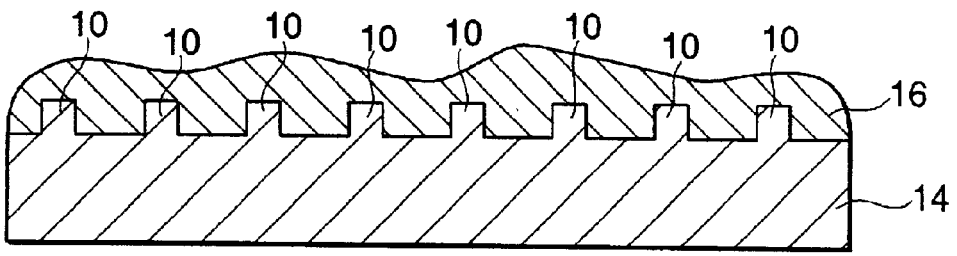
Figure 1E:
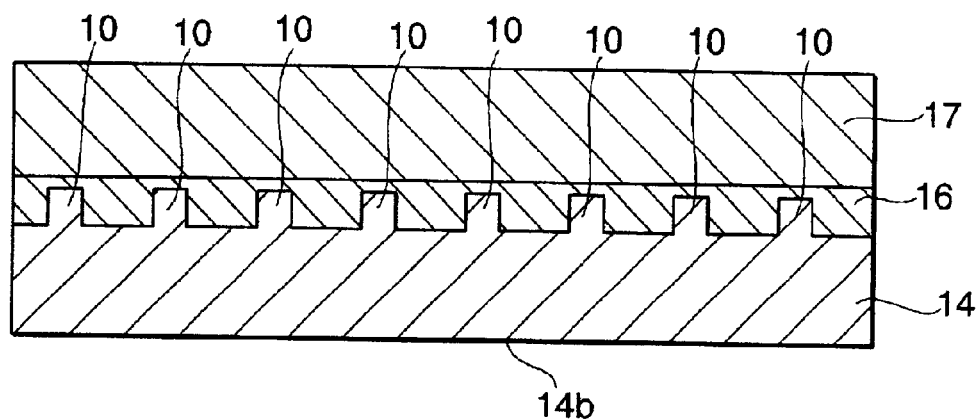

Then, a wax material 16 as wax material layer is put on the surface 14a of the silicon crystal substrate 14 in a manner that it covers each of the lens planes 10a being exposed by the removal of these mask patterns 15a and that it fills in concave portions among the lens planes 10a, as shown in FIG. 1(d). Next, by pressing s support substrate 17 on the wax material 16, as shown in FIG. 1(e), lens areas each containing a lens plane 10a, that is, lens element portions (10) are supported, through the wax material 16, by the support substrate 17. The wax material 16 and the support substrate form a holding means.

As the wax material 16, polishing wax being widely used to support lens materials at a time of polishing optical lenses may be employed. Moreover, as the support substrate 17, a support plate such as a semiconductor substrate or a glass plate can be used as appropriate.

Figure 1F:
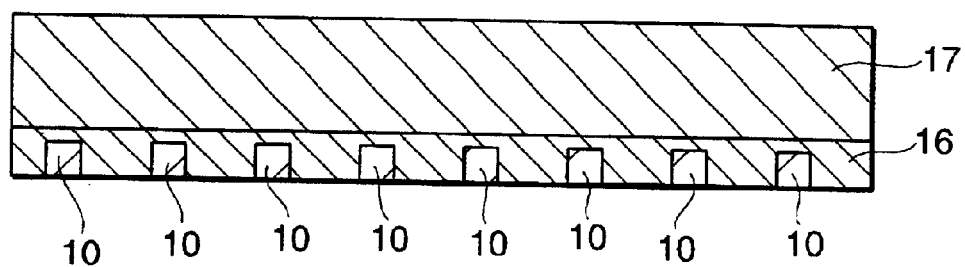

Polishing processing such as a chemical mechanical polishing process is performed on a rear face 14b of the silicon crystal substrate 14, with the lens element portions (10) being supported through the wax material 16 by the support substrate 17. By the polishing processing, as shown in FIG. 1(f), the silicon crystal substrate 14 excluding the lens element portions 10 is removed. The polishing processing is continued until the wax material 16 existing among lens element portions (10) is exposed.

After the completion of the polishing process, the wax material serving to hold each of the lens element portions (10) at the support substrate 17 is dissolved by using an organic solvent such as, for example, isopropyl alcohol, so that all the lens element portions 10 are separated from the support substrate 17, that is, many microlenses 10 each having the lens plane 10a are collectively formed.

Each microlens 10 is substantially a cylindrical shape as a whole, and has one end face on which the lens plane 10a is formed and another end face which is opposed to the one end face, as shown in FIG. 2.

By using the method of manufacturing the microlens 10 described above based on the photo-lithography and etching technology being used in Si LSI manufacturing process, many fine and small microlenses 10 can be collectively formed with high accuracy.

FIG. 3 shows one example in which a method for forming a lens plane of diffractive optical elements utilizing a diffraction phenomenon is applied to the method of forming the lens plane 10a described above. In the method for forming the lens plane of diffractive optical elements, as is conventionally well known, by obtaining a pattern of a photomask required for acquiring a desired optical characteristic from an optical path difference coefficient of an optical element exhibiting the desired optical characteristic using a computer and by performing etching processing using the obtained pattern on an optical substrate, the diffractive optical element having the desired characteristic can be produced.

In the example shown in FIG. 3, a method for forming a four-phase lens plane to be obtained by combination of two pieces of the mask patterns is presented. Moreover, in the FIG. 3(a) to (f), a side of a face of the silicon crystal substrate 14 where the lens plane 10a is formed is partially shown.

Figure 3A:
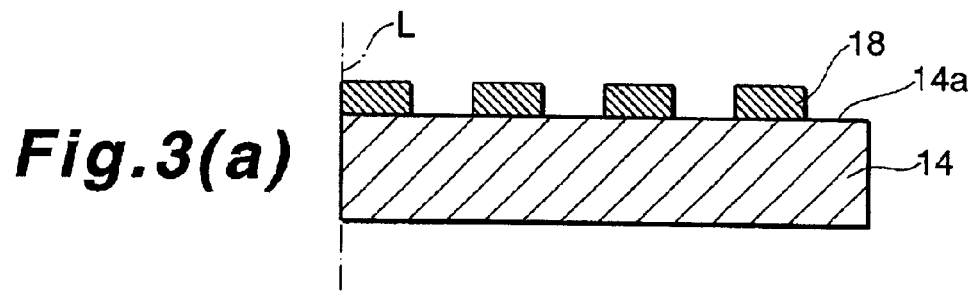
FIG. 3 is a process diagram showing one example of a method for forming a lens plane of the microlens according to the first embodiment.

As shown in FIG. 3(a), a first etching mask pattern 18 corresponding to a first photomask pattern obtained by using a operational result of a computer is formed on a silicon crystal substrate 14 serving as the optical substrate. The etching mask pattern 18 can be formed by performing selective exposing processing and developing processing using the first photomask pattern on a photoresist material made from, for example, a resist TSMR™ manufactured by Tokyo Oka Kogyo in Japan, which has been uniformly put on the silicon crystal substrate 14 so that its thickness is, for example, 1.8 μm.

Figure 3B:
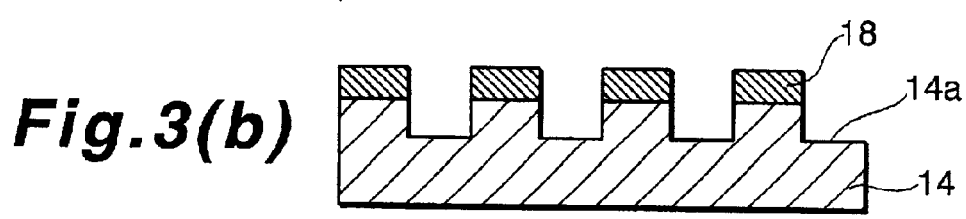

Next, reactive ion etching (RIE) processing using an etching gas such as, for example, $SF_6$ (sulfur hexafluoride) and using the first etching mask pattern 18 as an etching mask is performed on a surface 14a of the silicon crystal substrate 14. By the RIE processing, as shown in FIG. 3(b), a surface area of the silicon crystal substrate 14 being exposed outside the first etching mask pattern 18 is removed to a depth of, for example, 0.5 μm.

Figure 3C:
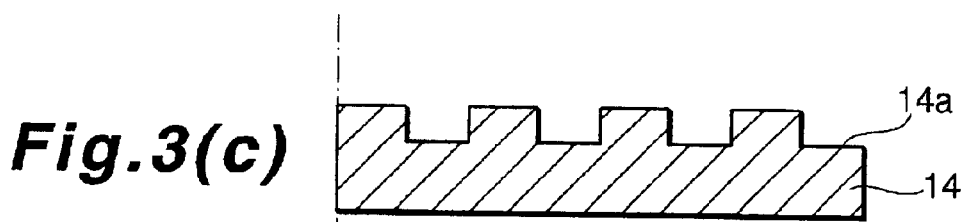
Figure 3D:
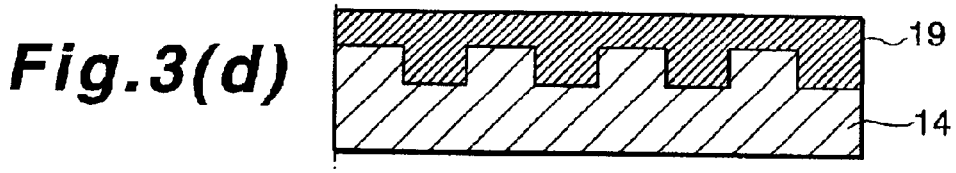
Figure 3E:
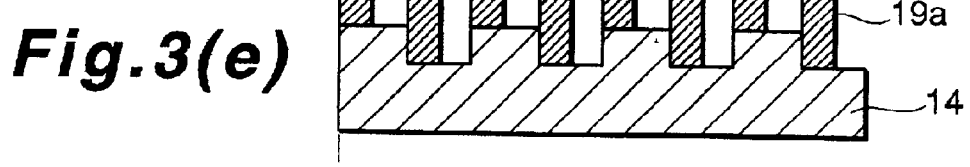

After the RIE processing using the first etching mask pattern 18 as the etching mask, as shown in FIG. 3(c), the first etching mask pattern 18 is removed, which causes a two-phase lens plane having two surface height levels to be formed on the silicon crystal substrate 14. Then, as shown in FIG. 3(d), the resist material 19 made from the same material as described above is formed in a manner that it covers all the lens planes. The same exposing and developing processing as described above using a second photomask pattern (not shown) obtained by using a computer is performed on the resist material 19. By the developing processing, as shown in FIG. 3(e), a second etching mask pattern 19a is formed so that each of portions of the lens plane having the two height levels is partially exposed.

Figure 3F:
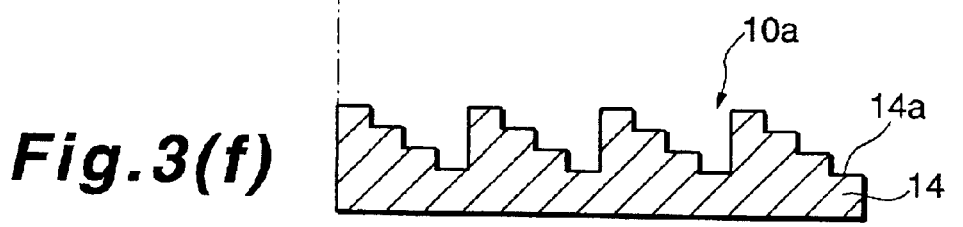

By the same selective etching using the second etching mask pattern 19a as described above, a area of the surface portions 14a of the silicon crystal substrate 14 being exposed outside the second etching mask pattern 19a is removed to a depth of, for example, 0.25 μm. After the second selective etching processing, as shown in FIG. 3(f), the second etching mask pattern 19a is removed, which causes four-phase lens plane 10a having four surface height levels to be formed on the surface 14a of the silicon crystal substrate 14. Moreover, in FIG. 3, to simplify the drawing, the illustration of one half portion seen from a center line L of one circular lens plane 10a is omitted.

Thus, the processing described in FIG. 1 is performed on the silicon crystal substrate 14 on which many lens planes 10a are formed in order to separate each of the microlenses 10 each having each lens plane 10a from the silicon crystal substrate 14.

Second Embodiment

In the first embodiment, as shown in FIG. 1(c), the etching to a desired depth D can be implemented by the single etching processing using the mask pattern 15a. However, if an etching to a comparatively large depth D being, for example, 200 μm is required, it is desirous that the same etching processing as described above is repeated, as shown in FIGS. 4 and 5.

Figure 4A:
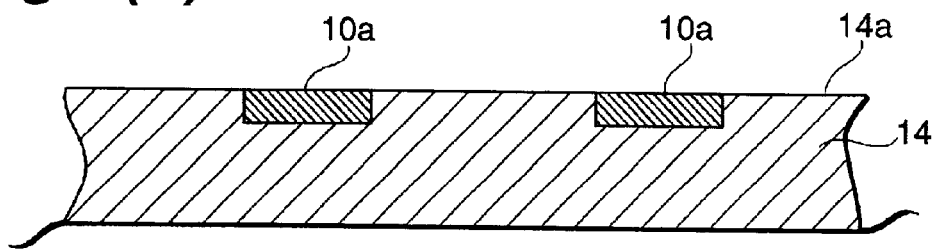
FIG. 4 is a process diagram (1) illustrating a method for forming a microlens according to a second embodiment of the present invention.

That is, as shown in FIG. 4(a), by the method explained in FIG. 3, many lens planes 10a are formed on the surface 14a of the silicon crystal substrate 14. A diameter of each lens plane 10a is, for example, about 123 μm, as described above.

Figure 4B:
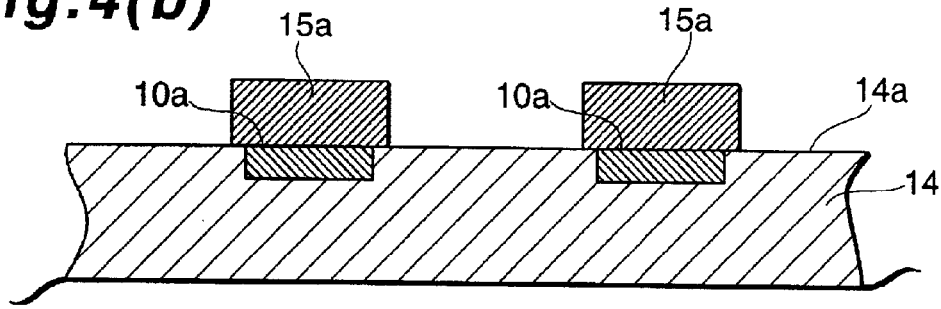

After the formation of the lens plane 10a, as shown in FIG. 4(b), a mask pattern 15a having a diameter being slightly larger in size than that of the lens plane 10a is formed so as to cover the lens plane 10a.

The mask pattern 15a may be made from silicon dioxide. The mask pattern 15a can be formed as follows. That is, first, the silicon dioxide with a thickness of 1 μm is stacked by, for example, a CVD (Chemical Vapor Deposition) method on the surface 14a of the silicon crystal substrate 14. Then, the same photoresist as used in the first embodiment is put on the silicon dioxide layer. By performing exposing and developing processing on the photoresist, an etching mask is formed. A selective etching processing using the etching mask is performed on the silicon dioxide layer to form the mask pattern 15a. To perform etching on the silicon dioxide, an anisotropic etching gas containing, for example, $CF_4$ and $O_2$ are used.

Figure 4C:
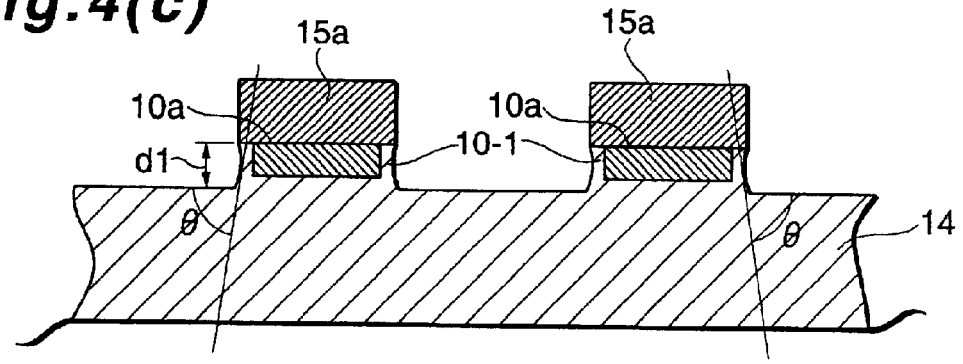

After the formation of the mask pattern 15a, as shown in FIG. 4(c), using the mask pattern 15a as an etching mask, the surface 14a of the silicon crystal substrate 14 is etched to a depth of, for example, 1 μm. In this etching, an etching gas exhibiting an anisotropic characteristic to silicon such as, for example, $SF_6$ is used.

By the etching processing using the etching gas, under each of these mask patterns 15a each having the diameter being slightly larger than that of the lens plane 10a, a cylindrical portion 10-1 containing the lens plane 10a and having a height d1 of about 1 μm is formed, as shown in FIG. 4(c). A face surrounding each of the cylindrical portions 10-1 has an arc-shaped concave curved surface in its cross sectional view along a center axis of the cylindrical portion.

When the height d1 of the cylindrical portion 10-1 is about 1 μm as described above, an angle θ formed by a tangential line of the concave curved surface at a rising portion of the cylindrical portion 10-1 and by a flat surface 14a of the silicon crystal substrate 14 is 87.5° being near to 90°. A maximum diameter of the cylindrical portion 10-1 is 125 μm at its both ends.

Figure 4D:
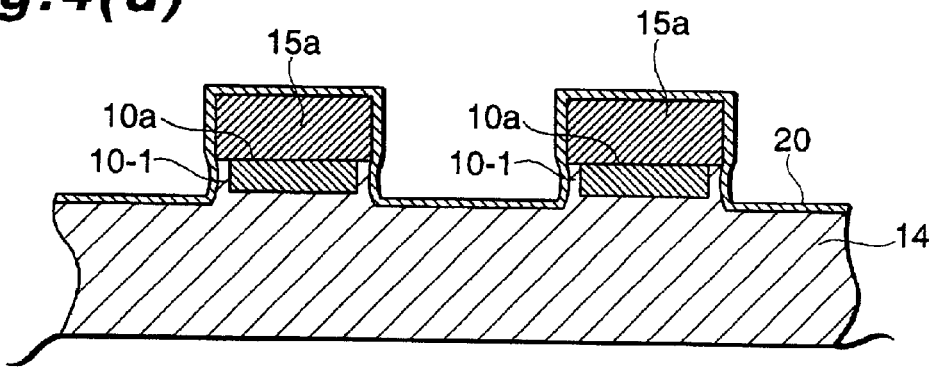

After the formation of the first cylindrical portion 10-1, as shown in FIG. 4(d), a protecting film 20 made from a polymer of $C_4F_8$ (octalfluorocyclobutane) is formed which covers an entire surface of the mask pattern 15a, the cylindrical portion 10-1 under the mask pattern 15a, and the silicon crystal substrate 14. This protecting film 20 can be formed by a plasma reaction of the $C_4F_8$.

Figure 5A:
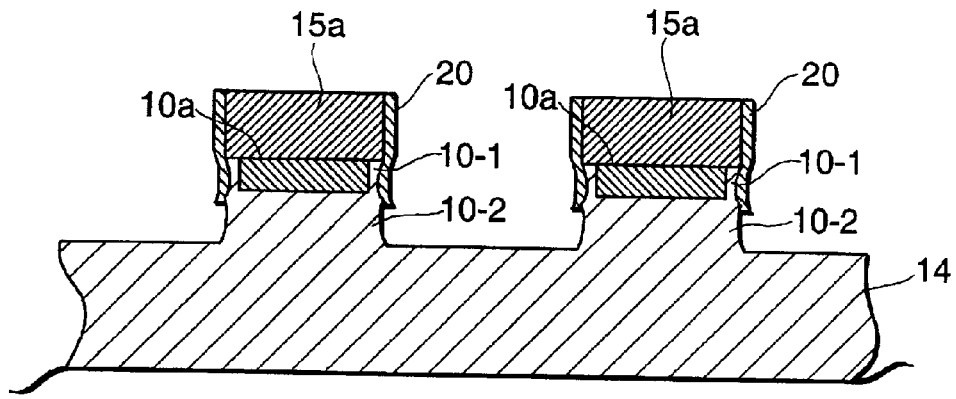
FIG. 5 is also a process diagram (2) illustrating the method for forming the microlens according to the second embodiment of the present invention.
Figure 5B:
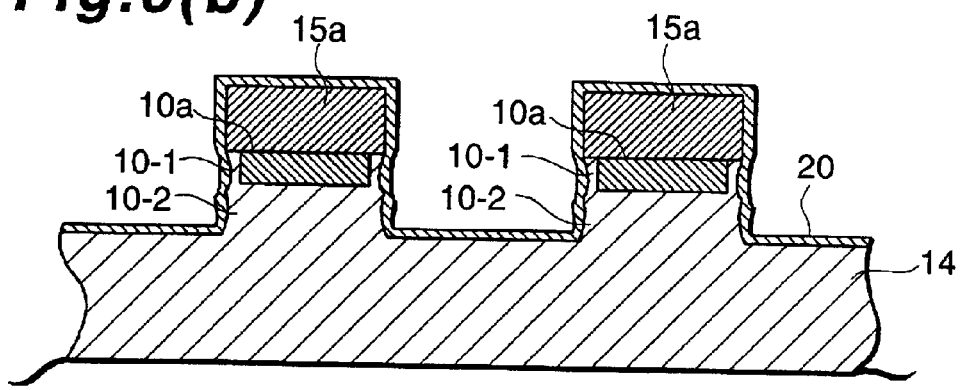

In a state in which portions surrounding a wall of the cylindrical portion 10-1 are covered by the protecting film 20, the surface of the silicon crystal substrate 14 is etched by etching processing using the anisotropic etching gas such as the described $SF_6$ (sulfur hexafluoride). Since the portions surrounding the wall of the cylindrical portion 10-1 are covered by the protecting film 20, a surface of the silicon crystal substrate 14 existing under the protecting film 20 is further etched by the etching processing, as shown in FIG. 5(a), a cylindrical portion 10-2 having a concave surrounding face defined by the same concave curved surface as the cylindrical portion 10-1 has, is formed serially under the cylindrical portion 10-1.

Moreover, the protecting film 20 is formed in the same manner as described above, as shown in FIG. 5(b), which covers the surface of the silicon crystal substrate 14 and the concave surrounding face of the cylindrical portion 10-2 both being exposed by the above etching processing.

After the formation of the new protecting film 20 covering portions surrounding the cylindrical portion 10-2, the next etching processing using the anisotropic etching gas such as the $SF_6$ gas is performed on the surface of the silicon crystal substrate 14.

Figure 5C:
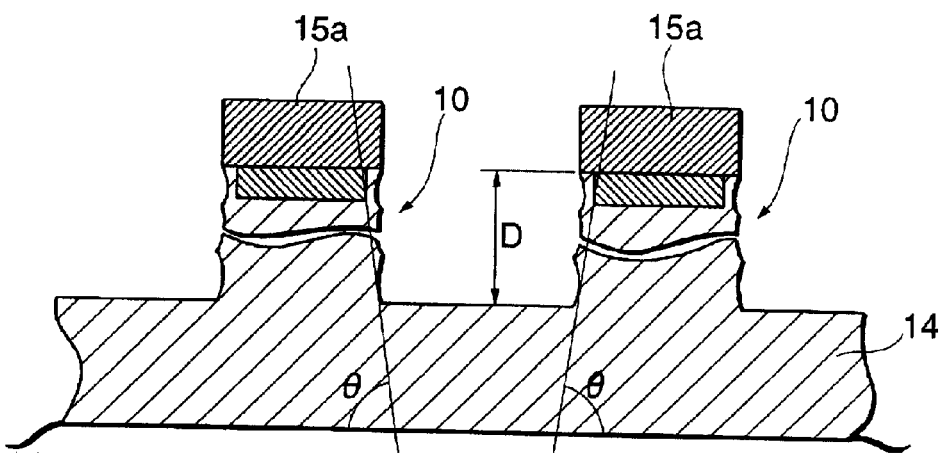

After processes of a new formation of the protecting film 20 covering portions surrounding faces of the cylindrical portion being newly exposed and further formation of new cylindrical portions by the etching processing under the protecting film having been repeated, as shown in FIG. 5(c), the protecting film 20 is removed finally. As a result, the lens element portion (10) consisting of many cylindrical portions 10-1 to 10-n being serially formed and having a desired thickness D and having the lens plane 10a at its end is formed.

Each of the lens element portions (10) is separated as the individual microlens 10 after the removal of the mask pattern 15a by the same processes as those explained in FIG. 1(d) to FIG. 1(f). A surface of the microlens 10 having been formed by repeated processes including the formation of the protecting film covering portions surrounding the surface of the cylindrical portion being exposed and the new formation of cylindrical portions by the subsequent etching processing under the protecting film, is of an outer shape having serially repeated concave curved surfaces, as shown in FIG. 5(c).

Third Embodiment

FIGS. 6 and 7 show a method for forming a microlens 10 by using an SOI (Silicon On Insulator) substrate. The SOI substrate 34, as is well known, is made up of a silicon substrate layer 34a, a silicon dioxide layer 34b, and silicon surface layer 34c. In the embodiment, the microlens 10 is formed in the silicon surface layer 34c having a thickness of 50 μm to 100 μm.

Figure 6A:
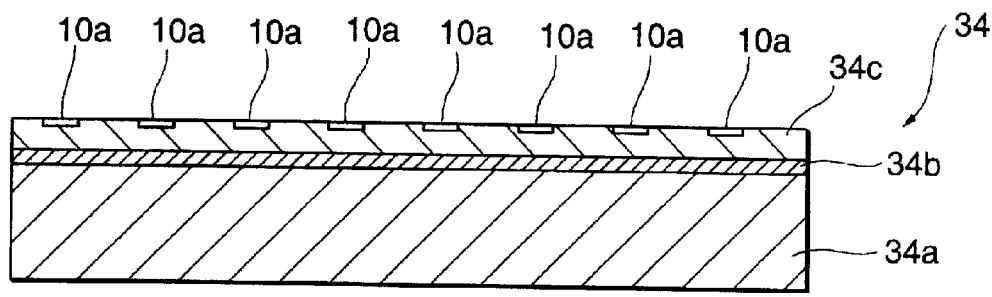
FIG. 6 is a process diagram illustrating a method for forming a microlens according to a third embodiment of the present invention.
Figure 6B:
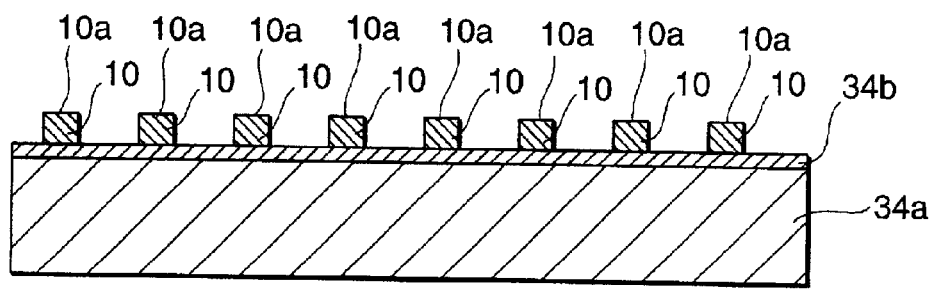

As shown in FIG. 6(a), many lens planes 10a are formed on the silicon surface layer 34c at regular intervals. Next, though not shown in the drawings, the plurality of mask patterns 15a each covering each of lens planes 10a are formed by the same step as shown by FIG. 1(b) of the method in the first embodiment, then a surface area of the silicon surface layer 34c being not covered by these mask patterns 15a each covering each of the lens planes 10a is etched. In this selective etching processing on the silicon layers, since the silicon dioxide layer 34b functions as an etching stopper, as shown in FIG. 6(b), the silicon dioxide layer 34b, even if it is exposed, is not etched much.

Therefore, at a time when the silicon dioxide layer 34b is exposed, the etching processing is stopped. Since the mask pattern (15a) (not shown) has been removed at this point, as shown in FIG. 6(b), specified lens element portions (10) can be left in a comparatively easy manner.

Figure 6C:
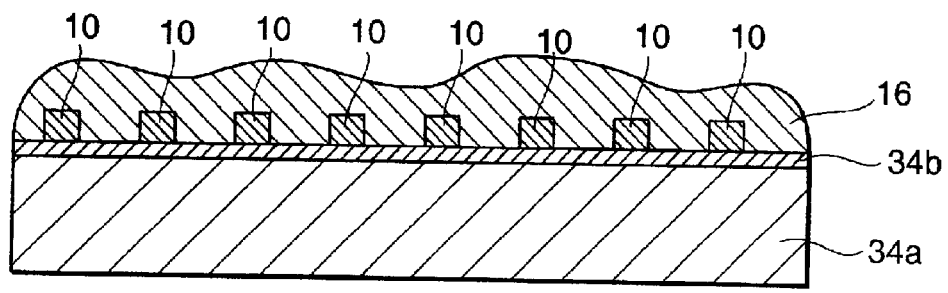
Figure 6D:
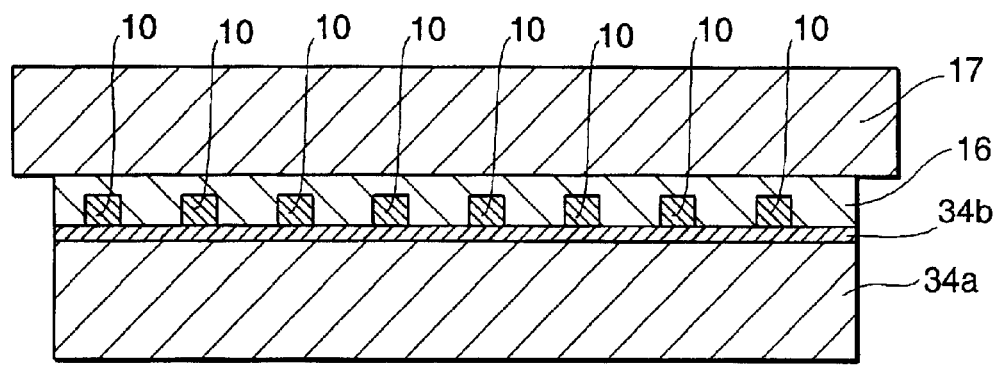

Each of the lens element portions (10) existing on the silicon dioxide layer 34b is coated with a wax material 16 as shown in FIG. 6(c), and each of the lens element portions (10) is supported by a support substrate 17 through the wax material 16 as shown in FIG. 6(d).

Figure 6E:
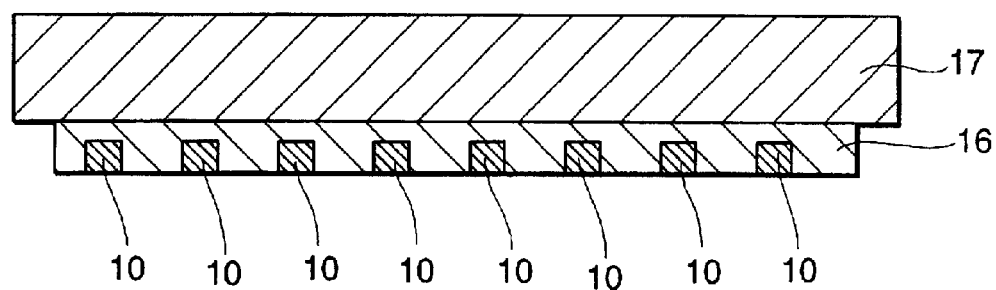

When residual portions of the SOI substrate 34 are dipped into, for example, hydrofluoride acid liquid, with each of the lens element portions (10) being supported by the support substrate 17, the silicon dioxide layer 34b is removed and, as a result, as shown in FIG. 6(e), each of the lens element portions (10) only is left on the support substrate 17 through the wax material 16.

Therefore, as in the first embodiment, by dissolving the wax material 16 in the same solvent as used described above, each of the lens element portions (10) can be separated from the support substrate 17, which enables many microlens 10 to be collectively formed.

As described above, by using the SOI substrate to form the microlens 10, each of the lens element portions (10) formed in the silicon substrate layer 34a of the SOI substrate 34 using the etching liquid can be separated from the silicon substrate layer 34a being bonded to the lens element portions (10) through the silicon dioxide layer 34b and therefore a polishing process to be performed on the silicon crystal substrate 14 required to separate each of the lens element portions (10) is made unnecessary. Moreover, the separated silicon substrate layer 34a, since it does not undergo the polishing process, can be re-used as the silicon substrate layer 34a of the SOI substrate.

As shown in FIG. 7, an antireflection film may be formed, if necessary, on both sides of the microlens 10.

Figure 7A:
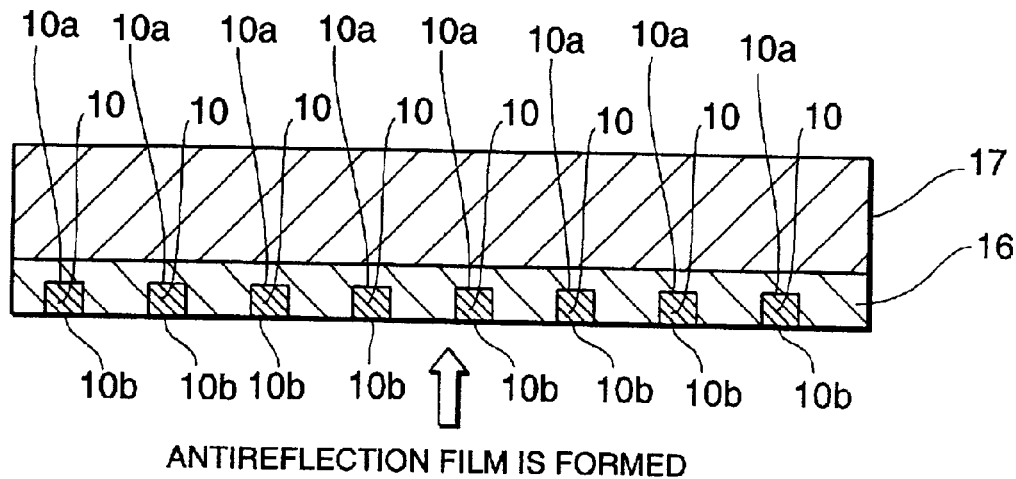
FIG. 7 is a process diagram illustrating a process of forming an antireflection film for the microlens according to the third embodiment of the present invention.

As shown in FIG. 7(a), while each of the lens element portions (10) is being held through the wax material 16 by the support substrate 17, a TiO$_2$ (titanium dioxide) film may be formed on an end face 10b placed on an opposite side of the lens plane 10a of the lens element portion (10) by using, for example, a vacuum evaporation system. The TiO$_2$ film may be formed by a sputtering method, instead of the vacuum evaporation method.

Figure 7B:
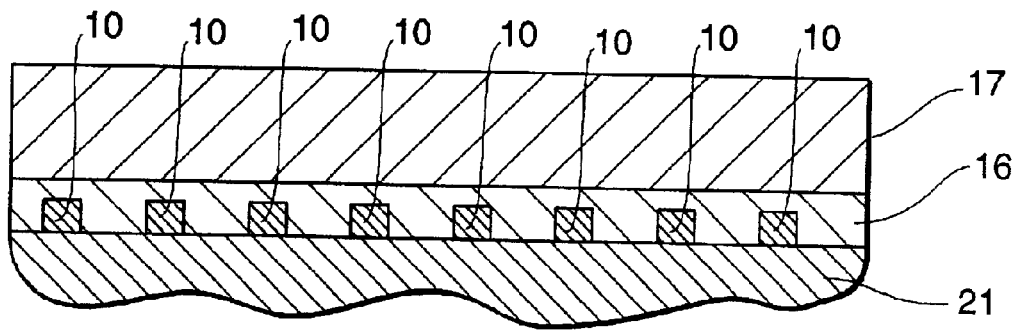
Figure 7C:
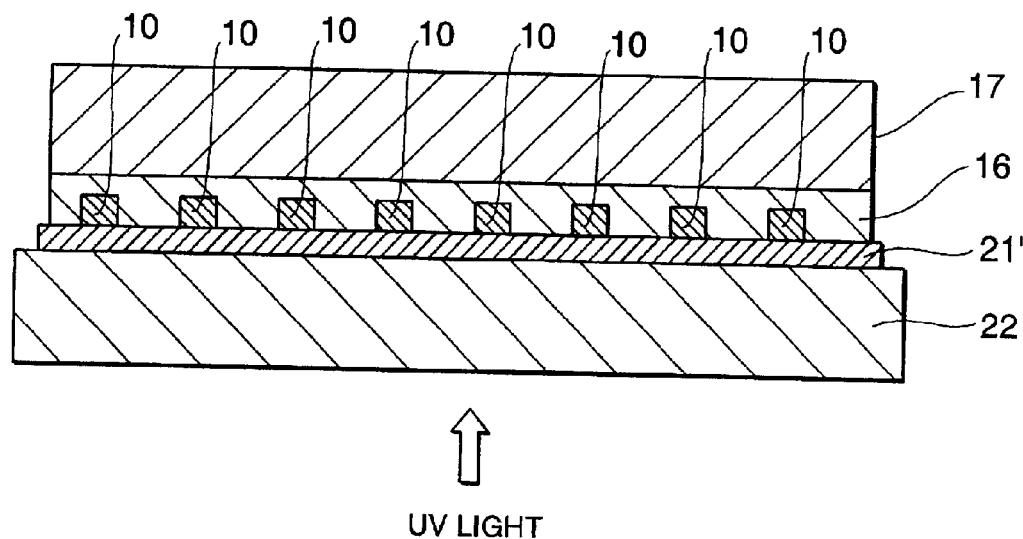

Then, as shown in FIG. 7(b), an UV resin layer 21 is applied in a manner that it covers an end face of each of the lens element portions (10) on which the antireflection film has been formed. Then, as shown in FIG. 7(c), a second support substrate 22 made from a silica material is placed to contact directly with the UV resin layer 21. The UV resin layer 21 is irradiated with ultraviolet (UV) light through the second support substrate 22.

When the UV resin layer 21 is cured by the irradiation of the ultraviolet (UV) light, a cured portion 21' being the cured UV resin layer 21 is formed. The lens element portions (10) are held through the cured portion 21 by the second support substrate 22. The UV resin layer 21 and the second support substrate 22 forms a support means.

Figure 7D:
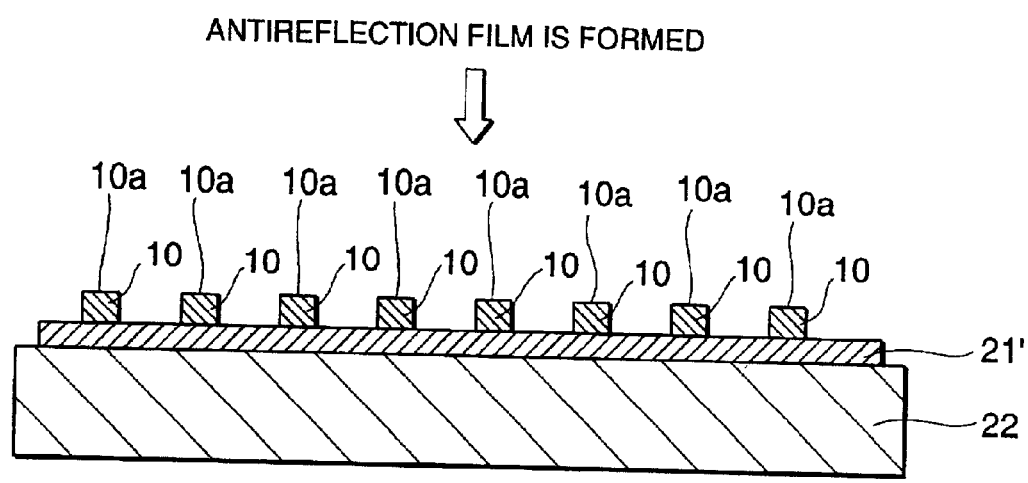

When the wax material 16 is removed, as described in first embodiment above, the first support substrate 17 is simultaneously removed and, as a result, the lens element portions (10) are fixed through the cured portion 21' on the second support substrate 22 in a manner that the lens planes 10a of the lens element portions (10) are exposed, as shown in FIG. 7(d).

On each of the lens planes 10a is formed the antireflection film in the same way as used in the formation of the antireflection on the end face 10b being positioned on the opposite side of the lens plane 10a. After the formation of the antireflection film on both sides of the lens element portions (10), the cured portion 21' is removed by using the solvent, which causes the lens element portions (10) to be separated from the second support substrate 22. As a result, the microlenses 10 with the antireflection film being formed on both the sides of each of the microlenses 10 can be collectively formed.

It is apparent that the present invention is not limited to the above embodiments but may be changed and modified without departing from the scope and spirit of the invention.

For example, in the first embodiment, each of the microlenses 10 is produced by separating the lens element portion (10) from the silicon crystal substrate 14, however, the microlens 10 may be produced by creating a replica of the lens element portion (10) using the silicon crystal substrate 14 with many lens element portions (10) formed therein as an original and then separating the lens element portion (10) from the replica.

To produce this replica, a mold made from, for example, a synthetic resin material is prepared using the silicon crystal substrate 14 with many lens element portions (10) formed as the original. Then, using the mold, the replica of the original is produced and the same polishing processing using the support substrate 17 as employed in the processes explained in FIG. 1(d) to FIG. 1(f) is performed on the replica to separate the lens element portions (10) from the produced replica and, as a result, many microlenses 10 can be obtained from the lens element portions (10).

Moreover, in the embodiments described above, the example of the microlens 10 made up of the diffractive optical element using the diffraction phenomenon in which the lens plane is formed on its one face is explained, however, the lens plane may be formed on both the faces of the microlens 10 if necessary. Also, the present invention may be applied not only to the microlens 10 made up of the diffractive optical element but also to the microlens made up of the refractive-type optical element, and the lens plane may have a desired shape and the microlenses may have a desired outer shape.

Furthermore, manipulating parts other than the lens plane which are used to facilitate handling of the microlens may be integrally formed if needed.

What is claimed is:

1. A method of forming a plurality of microlenses, comprising the steps of:

forming a plurality of lens planes on one surface of an optical substrate;

forming a plurality of mask portions respectively covering each of said lens planes;

forming lens element portions which has said lens plane and becomes said microlens respectively under each of said mask portions by an etching process conducted on said optical substrate;

removing all said mask portions;

holding said lens element portions by a holding means from the side said one surface of said optical substrate is located;

removing a remainder of said optical substrate excluding said lens element portions for leaving said lens element portions by a removing process;

eliminating said holding means from all said lens element portion by a eliminating process.

2. The method for forming the plurality of microlenses according to claim 1, wherein said etching process is a etching processing to etch an exposure area portion being not covered by said mask portions.

3. The method for forming the plurality of microlenses according to claim 1, wherein said etching process contains a etching processing to etch an exposure area portion being not covered by said mask portions for forming a part of each said lens element portion, a forming processing to form a protecting film covering a wall surrounding face of said part formed by said etching processing, and a film removing processing to remove said protecting film after completing said lens element portions by conducting said etching processing and said forming processing repeatedly.

4. The method for forming the plurality of microlenses according to claim 1, wherein said etching process is conducted by using etching gas exhibiting an anisotropic etching characteristic.

5. The method for forming the plurality of microlenses according to claim 1, wherein said optical substrate is made up of a crystal substrate.

6. The method for forming the plurality of microlenses according to claim 5, wherein said crystal substrate is a silicon crystal substrate, said removing process is polishing processing.

7. The method for forming the plurality of microlenses according to claim 1, wherein said optical substrate has a silicon layer having said one surface and providing a thickness in correspondence with a length of said microlens, and a silicon dioxide layer fixed on said silicon layer, said removing process is a dissolving processing to dissolve said silicon dioxide layer.

8. The method for forming the plurality of microlenses according to claim 1, wherein said optical substrate is a SOI substrate consisting of a silicon layer having said one surface and providing a thickness in correspondence with a length of said microlens, a silicon dioxide layer fixed on said silicon layer, and a silicon substrate layer fixed on said silicon dioxide layer, said removing process is a dissolving processing to dissolve said silicon dioxide layer.

9. The method for forming the plurality of microlenses according to claim 1, wherein said holding means consists of a wax material layer used to fill the space between said lens element portions and covering all said lens element portions, and a holding substrate fixed on said wax material layer, said eliminating process is a dissolving processing to dissolve said wax material layer.

10. The method for forming the plurality of microlenses according to claim 1, wherein said microlens is a diffractive optical element, said lens plane is a lens plane of said diffractive optical element.

11. The method for forming the plurality of microlenses according to claim 1, moreover comprising the steps of:

forming a antireflection film on each of end faces of all said lens element portions which is located on an opposite side of said lens plane after finishing said removing process;

using a support means to support all said lens element portions from the side all said end face are located on which said antireflection film is formed before conducting said eliminating process;

forming a antireflection film on said lens planes of all said lens element portions after finishing said eliminating process;

and removing said support means from all said lens element portions by conducting a support means eliminating process.

12. The method for forming the plurality of microlenses according to claim 11, wherein said support means has a support substrate to support all said lens element portions through UV(Ultraviolet) resin layer, said support means eliminating process is a dissolving processing to dissolve said UV resin layer.

* * * * *